H. M. GIFFIN.
CLUTCH.
APPLICATION FILED AUG. 13, 1919.
1,355,139.
Patented Oct. 12, 1920.
2 SHEETS—SHEET 1.
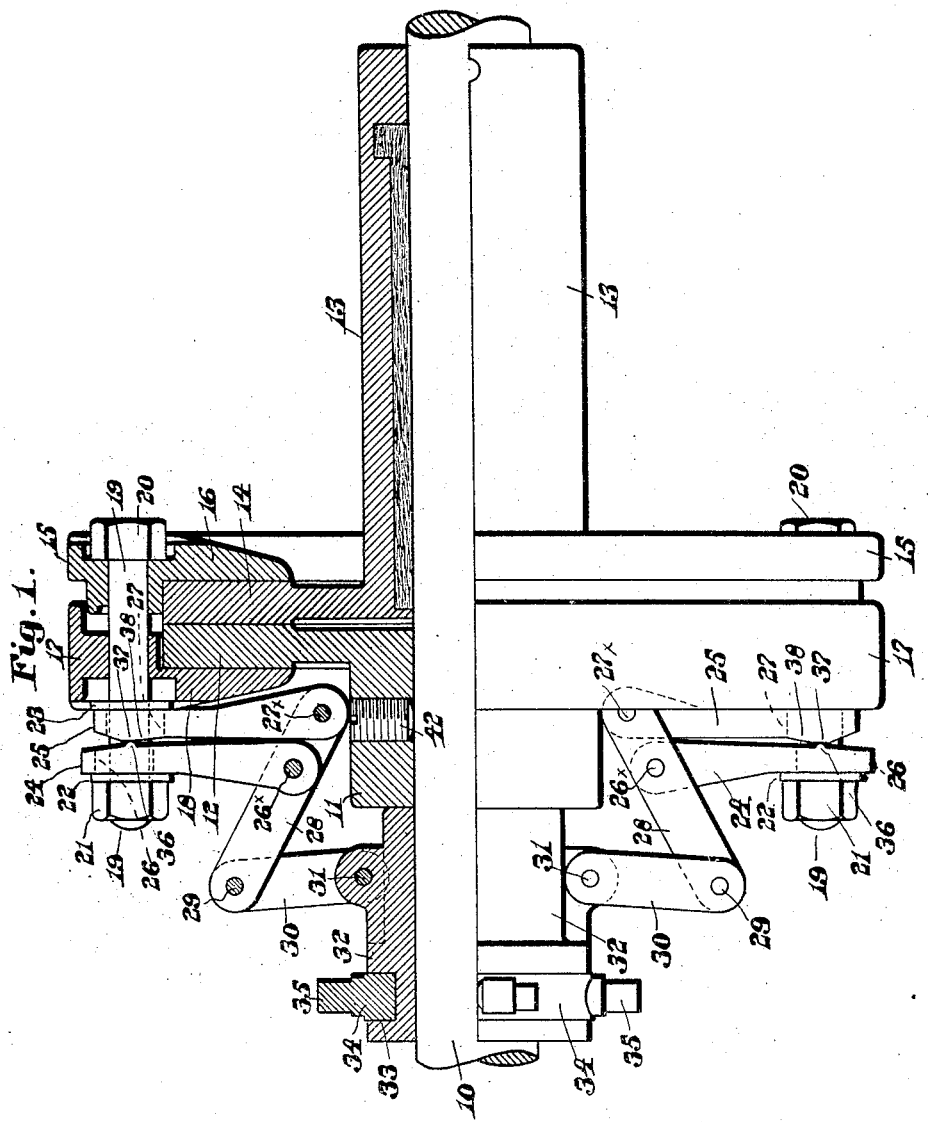
Inventor:
Harrie M. Giffin,
by Walter E. Lombard,
Atty.

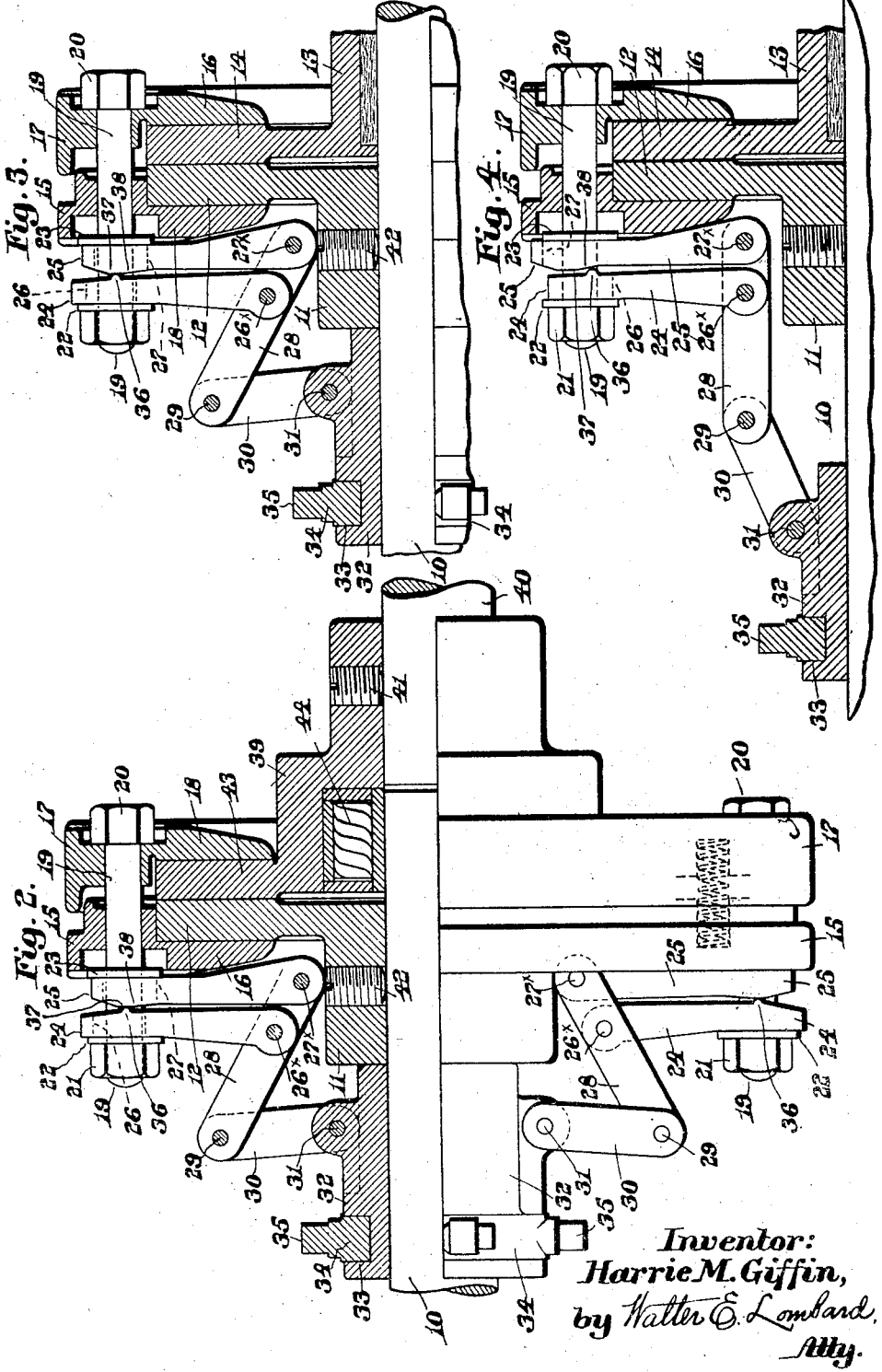

UNITED STATES PATENT OFFICE.

HARRIE M. GIFFIN, OF JAMAICA PLAIN, MASSACHUSETTS.

CLUTCH.

1,355,139.  Specification of Letters Patent.  Patented Oct. 12, 1920.

Application filed August 13, 1919. Serial No. 317,583.

*To all whom it may concern:*

Be it known that I, HARRIE M. GIFFIN, a citizen of the United States of America, and a resident of Jamaica Plain, in the county of Suffolk and Commonwealth of Massachusetts, have invented certain new and useful Improvements in Clutches, of which the following is a specification.

This invention relates to friction clutches and has for its main object the production of a clutch of this class which is simple in construction and which may be readily changed to accommodate it to be used for various forms of power transmission.

The invention consists in certain novel features and arrangement of parts which will be readily understood by reference to the description of the drawings and to the claims to be hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 1 represents a partial elevation and partial longitudinal section of a clutch embodying the principles of the present invention with the various parts positioned to adapt the device for one form of power transmission.

Fig. 2 represents a sectional detail showing the parts of the clutch assembled to adapt the device to be used for a cut-off coupling.

Fig. 3 represents a partial elevation and partial longitudinal section of the device as used for a different form of power transmission than that shown in Fig. 1, and Fig. 4 represents a partial elevation and partial section similar to Fig. 3 with the clutch members in open position.

Similar characters indicate like parts in the several figures of the drawings.

In the drawings, 10 is a revoluble shaft having secured thereto a cylindrical member 11 provided with an annular flange 12. The shaft 10 also has revolubly mounted thereon a cylindrical member 13 provided with an annular flange 14 of the same diameter as the flange 12, said member 13 being adapted to move endwise slightly on the shaft 10.

Referring to Fig. 1, the annular flange 14 has tightly fitted to its periphery a ring 15 provided with an annular shoe 16, the inner face of which is in contact with the outer face of the annular flange 14 and immovable relatively thereto during the operation of the device.

Surrounding the annular flange 12 is an annular member or ring 17 provided with an annular shoe 18, the inner face of which is adapted to be moved into frictional contact with the outer face of the said flange 12.

The ring 15 and the annular member or ring 17 are provided with a plurality of draw bolts 19.

Each draw bolt is provided at one end with a hexagonal head 20 while the opposite end of said bolt has threaded thereto an adjusting nut 21.

Surrounding each bolt 19 between the annular member 17 and the adjusting nut 21 are the washers 22 and 23.

Between the washers 22 and 23 are positioned two arms 24 and 25, said arms being provided with elongated slots 26 and 27 through which the draw bolt 19 extends. The opposite ends of said arms 24 and 25 are pivoted respectively at 26× and 27× to one end of a bar 28, the opposite end of which is pivoted at 29 to one end of a link 30.

The opposite end of the link 30 is pivoted at 31 to a cylindrical member 32 slidable longitudinally of the shaft 10.

This slidable member 32 is provided with an annular groove 33 in which is disposed a ring 34 provided with trunnions 35 adapted to be positioned in the ends of a suitable shipper lever. This shipper lever is not shown in the drawings, as it forms no part of the present invention.

The arm 24 is provided with a transverse ridge 36 on its inner face which coacts with a V-shaped projection on the adjacent face of the arm 25. This V-shaped projection or wedge member consists in part of a flat bearing surface 37 perpendicular to the axis of the draw bolt 19 and an inclined bearing surface 38 extending inwardly from said bearing surface 37.

When the various clutch members are in their closed position the ridge 36 bears against the flat bearing surface 37 as shown in Fig. 1 of the drawings.

When in closed position the slidable member 32 rests against the end of the tubular member 11 and the adjusting nut 21 is adjusted to give the required frictional contact between the shoe 18 and the flange 12.

With the ring 15 tightly fitting the flange 14 and the shoe 18 held in frictional contact with the flange 12 it is obvious that any rotation imparted to the shaft 10 and the flange member 11 will be imparted to the tubular member 13.

By moving the slidable member 32 into the position shown in Fig. 4 of the drawings, the arms 24 and 25 will be moved in opposite directions in paths perpendicular to the axis of the draw bolt 19 thus causing the ridge 36 to be moved from the bearing surface 37 down the inclined surface 38.

This movement of the arms 24 and 25 will relieve the pressure upon the draw bolt 19 and reduce the frictional contact between the shoe 18 and flange 12 sufficiently to prevent further rotary movement being imparted to the tubular member 13. It is obvious from an inspection of the drawings that the slots 26 and 27 are elongated to permit the reciprocation of said arms relatively to each other, said arms being shown in one extreme position in Fig. 1 and in the other extreme position in Fig. 4 of the drawings.

By making the tubular members 11 and 13 with peripheral flanges 12 and 14 of the same diameter it is possible to interchange the rings 15 and 17, causing the ring 15 to be tightly fitted to the flange 12 as indicated in Fig. 3 and having the ring or annular member 17 loosely surrounding the flange 14 as indicated in Fig. 3, the tubular member 11 becoming a driven member instead of a driving member as is the case where the parts are positioned as shown in Fig. 1 of the drawings. It is self evident from an inspection of the drawings that two distinct forms of clutches may be provided by the assembling of the same instrumentalities, the only change required to accomplish this object being the interchanging of the ring members 15 and 17.

In order to assemble the various instrumentalities of the clutch to form a cut-off coupling the tubular member 13 is dispensed with and a tubular member 39 is substituted therefor.

This member 39 is secured to a second shaft 40 by means of a set screw 41, said shaft 40 being in alinement with the shaft 10 to which the tubular member 11 is secured by means of the set screw 42.

The member 39 is provided with a peripheral flange 43 of the same diameter as the diameter of the flanges 12 and 14.

The member 39 is provided with a roller bearing 44 of any well known construction, said roller bearing being mounted in a recess in said member 39 and supported upon the end of the shaft 10.

It is obvious that when the various instrumentalities are assembled as indicated in Fig. 2, the shaft 40 may be rotated, as desired, by means of the rotary movement of the shaft 10 being imparted thereto through the flanges 12 and 43 and the shoes 16 and 18 coacting therewith. When the slidable member 32 is moved into the position indicated in Fig. 4 of the drawings and the shoe 18 is moved from frictional contact with the flange 43 further rotary movement of said member 39 will be prevented. A unit system of instrumentalities is thus provided and various selected members may be assembled together for various purposes, as for instance, two distinct forms of clutches. As a consequence, a dealer is not required to keep on hand a quantity of each of these devices but may, by keeping on hand a plurality of the various elements described, assemble these instrumentalities to form either one of the devices desired by an intending purchaser.

This makes a very simple and effective construction of frictional clutch, the operation and many advantages of which, it is believed will be readily understood without further description.

Having thus described my invention, I claim:

1. In a device of the class described, two tubular members each provided with a peripheral flange, said flanges having faces perpendicular to the axis of said tubular members adapted to contact frictionally with each other; a ring tightly fitting the periphery of one flange and having an annular shoe abutting the outer face of said flange and immovable relatively thereto during the operation of the device; an annular member surrounding the other flange but separated therefrom and provided with an annular shoe abutting the outer face of said other flange; means extending through and wholly supported by said ring and annular member for moving said shoes toward each other; and means for actuating said moving means.

2. In a device of the class described, two tubular members each provided with a peripheral flange, said flanges having faces perpendicular to the axis of said tubular members adapted to contact frictionally with each other; a ring tightly fitting the periphery of one flange and immovable relatively thereto during the operation of the device; an annular shoe abutting the outer face of said flange; an annular member surrounding the other flange but separated therefrom and provided with an annular shoe abutting the outer face of said other flange; means extending through and wholly supported by said ring and annular member for moving said shoes toward each other; a movable member in alinement with said tubular members; and toggle mechanism interposed between said movable member and said moving means.

3. In a device of the class described, two tubular members each provided with a peripheral flange; a ring tightly fitting the periphery of one flange and having an annular shoe abutting the outer face of said flange; an annular member surrounding the other flange but separated therefrom and provided with an annular shoe abutting the outer face of said other flange; a movable member in alinement with said tubular members; a link pivoted to the said movable member; a bar pivoted to the opposite end of said link; two arms pivoted to the free end of said bar, one of said arms being provided with a projection bearing against the adjacent face of the free end of the other arm; a bolt extending through both said arms, said ring, and said annular member; and a nut threaded to said bolt and bearing against the outer face of the outer arm.

4. In a device of the class described, two tubular members each provided with a peripheral flange; a ring tightly fitting the periphery of one flange and having an annular shoe abutting the outer face of said flange; an annular member surrounding the other flange but separated therefrom and provided with an annular shoe abutting the outer face of said other flange; a movable member in alinement with said tubular members; a link pivoted to said movable member; a bar pivoted to the opposite end of said link; two arms pivoted to the free end of said bar, one of said arms being provided with a projection bearing against the adjacent face of the free end of the other arm, and the other arm having a V-shaped extension with which said projection coacts.

5. In a device of the class described, two tubular members provided with peripheral flanges of the same diameter; two rings fitting over the peripheries of said flanges and having shoes adapted to contact with the outer faces thereof, one of which rings is adapted to tightly fit the periphery of a flange and is adapted to be positioned on either flange and be immovable relatively thereto during the operation of the device while the other ring is free from contact with the periphery of the other flange; means extending through said rings for clamping said rings and flanges together; and means for actuating said clamping means.

6. In a device of the class described, two tubular members each provided with a peripheral flange; a ring tightly fitting the periphery of one flange and having an annular shoe abutting the outer face of said flange; an annular member surrounding the other flange but separated therefrom and provided with an annular shoe abutting the outer face of said other flange; a movable member in alinement with said tubular members; a link pivoted thereto; a bar pivoted to the opposite end of said link; two arms pivoted to the free end of said bar, having elongated slots in their free ends, one of said arms being provided with a projection bearing against the adjacent face of the free end of the other arm; a bolt extending through both said arms, said ring, and said annular member; and a nut threaded to said bolt and bearing against the outer face of the outer arm.

7. In a device of the class described, two tubular members provided with peripheral flanges of the same diameter; a ring surrounding each flange and each provided with an annular shoe abutting the outer face of one of the flanges; draw bolts extending through said rings; and means coacting with said draw bolts for moving one of said rings toward the other into frictional contact with one of said flanges.

8. In a device of the class described, two tubular members provided with peripheral flanges of the same diameter; a ring surrounding each flange and each provided with an annular shoe abutting the outer face of one of the flanges; draw bolts extending through said rings; and link mechanism coacting with said draw bolts for moving one of said rings toward the other into frictional contact with one of said flanges.

9. In a device of the class described, two tubular members provided with peripheral flanges of the same diameter; a ring surrounding each flange and provided with an annular shoe abutting the outer face of said flange; draw bolts extending through said rings; a nut threaded to each bolt; two slotted arms on each bolt between said nut and one of said rings, one of said arms having a wedge projection thereon coacting with a transverse ridge on the other arm; and means for moving said arms relatively to each other to vary the pressure on said draw bolt.

10. In a device of the class described, two tubular members provided with peripheral flanges of the same diameter; a ring surrounding each flange and provided with an annular shoe abutting the outer face of said flange; draw bolts extending through said rings; a nut threaded to each bolt; two slotted arms on each bolt between said nut and one of said rings, one of said arms having a wedge projection thereon coacting with a transverse ridge on the other arm; and link mechanism for moving said arms relatively to each other to vary the pressure on said draw bolt.

11. In a device of the class described, two tubular members provided with peripheral flanges of the same diameter; a ring surrounding each flange and provided with an annular shoe abutting the outer face of said flange; draw bolts extending through said rings; a nut threaded to each bolt; two slotted arms on each bolt between said nut and one of said rings, one of said arms having a wedge projection thereon coacting with a transverse ridge on the other arm, said wedge projection consisting of a flat bearing surface perpendicular to said draw bolt and an inclined bearing face extending inwardly therefrom; and means for moving said arms relatively to each other to vary the pressure on said draw bolt.

12. In a device of the class described, two tubular members provided with peripheral flanges of the same diameter; a ring surrounding each flange and provided with an annular shoe abutting the outer face of said flange; draw bolts extending through said rings; a nut threaded to each bolt; two slotted arms on each bolt between said nut and one of said rings, one of said arms having a wedge projection thereon coacting with a transverse ridge on the other arm; and means for moving said arms relatively to each other and in paths perpendicular to said draw bolts.

13. In a device of the class described, a plurality of driving and driven elements with peripheral flanges of the same diameter; two rings surrounding the flanges of two selected elements, said rings being interchangeable and one of which is adapted to tightly fit the periphery of a flange while the other ring is free from contact with the periphery of the other flange; draw bolts extending through said rings; and means coacting with said draw bolts for moving one of said rings into frictional contact with one of said flanges.

Signed by me at 4 Post Office Square, Boston, Mass., this 12th day of August, 1919.

HARRIE M. GIFFIN.

Witnesses:
 WALTER E. LOMBARD,
 NATHAN C. LOMBARD.